US012565939B2

(12) United States Patent
Liang et al.

(10) Patent No.: US 12,565,939 B2
(45) Date of Patent: Mar. 3, 2026

(54) ELECTRIC DIVERTER VALVE CAPABLE OF REALIZING ACCURATE FLOW CONTROL

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 163 days.

(21) Appl. No.: 18/592,385

(22) Filed: Feb. 29, 2024

(65) Prior Publication Data

US 2025/0122947 A1     Apr. 17, 2025

(30) Foreign Application Priority Data

Oct. 13, 2023    (CN) ......................... 202322749827.X

(51) Int. Cl.
*F16K 31/04* (2006.01)

(52) U.S. Cl.
CPC .................................. *F16K 31/046* (2013.01)

(58) Field of Classification Search
CPC .. F16K 31/046; F16K 31/041; F16K 11/0856; F16K 11/076; F16K 11/24; F16K 37/0058; G01D 5/3473
See application file for complete search history.

(56) References Cited

U.S. PATENT DOCUMENTS

| | | | | |
|---|---|---|---|---|
| 4,398,562 | A | * | 8/1983 | Saarem ................. F16K 31/041 |
| | | | | 318/47 |
| 5,278,530 | A | * | 1/1994 | Zovath ................... H01H 36/00 |
| | | | | 335/185 |
| 11,339,895 | B2 | * | 5/2022 | Brown ................ F16K 37/0041 |
| 11,359,743 | B2 | * | 6/2022 | Liu ........................... H02K 7/14 |
| 2005/0274915 | A1 | * | 12/2005 | Holcomb ............. G01F 23/446 |
| | | | | 250/577 |
| 2007/0044856 | A1 | * | 3/2007 | Bonior ................ F16K 11/0856 |
| | | | | 137/625.47 |
| 2009/0151438 | A1 | * | 6/2009 | Kemppainen ........ G01D 5/3473 |
| | | | | 73/115.01 |

(Continued)

FOREIGN PATENT DOCUMENTS

GB            757922 A * 9/1956

*Primary Examiner* — Jessica Cahill
(74) *Attorney, Agent, or Firm* — Frank Niranjan

(57) ABSTRACT

An electric diverter valve includes a controller which controls a motor to drive a valve core to rotate with respect to a valve body to realize multi-stage control of the corresponding water flow rate of water outlets. Moreover, a disk with rectangular holes is provided to work together with a first control circuit board comprising an infrared detection module and an MCU. The MCU can obtain the length of a current rectangular hole according to the duration of week reflected infrared signals passing through the current rectangular hole of the disk to obtain the absolute position of a rotating shaft which is fed back to the controller. Thus, the absolute rotation positions of the rotating shaft and the valve core can be known and the flow proportion of different water outlets can be obtained. The users are allowed to perform multi-stage control of the water flow rate according to requirements.

7 Claims, 7 Drawing Sheets

(56)　　　　　References Cited

U.S. PATENT DOCUMENTS

| | | | |
|---|---|---|---|
| 2016/0348798 A1* | 12/2016 | Saunders | F16K 11/06 |
| 2021/0055136 A1* | 2/2021 | Sapija | G01D 5/3473 |
| 2021/0164576 A1* | 6/2021 | Cheng | F16K 11/0873 |

* cited by examiner

ELECTRIC DIVERTER VALVE CAPABLE OF REALIZING ACCURATE FLOW CONTROL

FIELD

The invention relates to the field of application of electric diverter valves, in particular to an electric diverter valve capable of realizing accurate flow control.

BACKGROUND

At present, there are many manual diverter valves on the market. It takes much effort to rotate the valve core of manual diverter valves, the manual diverter valves are not suitable for physically weak users; and because the rotary knob and valve core of the manual control valves must be coaxially connected, a large space is occupied.

For the above reason, electric diverter valves are gradually preferred by customers. The valve core of the electric diverter valves is generally driven by a motor to rotate by a certain angle to control the outlet flow rate of water outlets realize water flow control. A common method for controlling the rotation angle of the valve core is to use a motor with a pulse feedback function to drive the valve core to rotate. Every time the motor rotates by one circle, a certain number of pulses will be feedback, and the rotation angle or position of the motor can be obtained by calculating the number of pulses through a microcontroller unit (MCU).

However, when this method is used, the motor needs to return first and determine the initial angle or position of the motor. With respect to the initial position, the position obtained through this method is a relative position. With the rotation of the motor, a cumulative error will be generated, and the cumulative error can be eliminated only by returning of the motor. The current position of the motor is calculated with reference to previous position information. If the previous position information is lost, incorrect or disturbed, the accuracy of the current position will be affected. Therefore, this method, when applied to electric diverter valves, easily causes a cumulative error and is low reliability, leading to low control accuracy of the diverter valves.

SUMMARY

In view of the problems of large errors and low reliability and accuracy of the method for obtaining the relative rotation position of a motor by calculating the number of pulses feedbacked by the motor through an MCU in the prior art, the invention provides an electric diverter valve which can realize accurate control of the water flow rate of water outlets through electric drive.

In one aspect, the present invention provides an electric diverter valve which comprises a controller, a brushless direct-current motor; a valve core comprising a water inlet and a plurality of water outlets; and a valve body comprising a water inlet tube and water outlet tubes in one-to-one correspondence with the water outlets. The electric diverter valve further comprises a first control circuit board which is arranged fixedly, and an infrared detection module and a MCU which are arranged on the first control circuit board. The controller is electrically connected to the first control circuit board and the brushless direct-current motor in sequence. A rotating shaft of the brushless direct-current motor is detachably connected to the valve core through a connecting member. A position disk is fixedly arranged on the rotating shaft and comprises a disk body and a plurality of rectangular holes which are regularly formed in the disk body in a circumferential direction and have different lengths. The infrared detection module is located above a side of any one of the rectangular holes and configured for transmitting infrared signals and receiving infrared signals reflected by the disk body or via the rectangular holes of the disk body when the rotating shaft rotates. The MCU is configured to acquire a length of a present one of the rectangular holes located below the infrared detection module according to an intensity and duration (length of time) of the reflected infrared signals via the present one of the rectangular holes to obtain an absolute position of the rotating shaft and feeds the absolute position of the rotating shaft back to the controller. Users is capable of controlling, through the controller, the brushless direct-current motor to drive the connecting member and the valve core to rotate forward or reversely with respect to the valve body, such that multi-stage control of a corresponding water flow rate of the water outlets is realized.

Preferably, the controller is a touch controller which comprises a touch panel and a second control circuit board; a plurality of flow control buttons is arranged on the touch panel; and the second control circuit board is electrically connected to the first control circuit board and the brushless direct-current motor in sequence.

Preferably, the rectangular holes are in one-to-one correspondence with the flow control buttons.

Preferably, the infrared detection module comprises an infrared transmitting tube and an infrared receiving tube.

Preferably, the electric diverter valve further comprises a waterproof box for accommodating the brushless direct-current motor and the first control circuit board, the waterproof box is mounted in the valve body and comprises a box body and a cover, and an O-shaped sealing ring is arranged between the cover and the box body.

Preferably, a connecting through-hole is formed in a bottom of the box body, the valve core is provided with a connecting portion, and the connecting portion passes through the connecting through-hole and is then connected to the connecting member.

Preferably, a star-shaped sealing ring is arranged between the connecting portion of the valve core and the connecting through-hole of the waterproof box.

The invention has the following beneficial effects: the controller controls the brushless direct-current motor to perform phase rotation to drive the connecting member and the valve core to rotate forward or reversely with respect to the valve body to realize multi-stage control of the corresponding water flow rate of water outlets, thus solving the problem that manual diverter valves are difficult to adjust and occupy a large space. Moreover, the rectangular-hole position disk is arranged to work together with the first control circuit board comprising the infrared detection module and the MCU, and the MCU can obtain the length of the current rectangular hole according to the duration of infrared signals with week intensity reflected through rectangular holes of the rectangular-hole position disk to obtain the absolute position of the rotating shaft and feed the absolute position of the rotating shaft back to the controller, such that the absolute rotation positions of the rotating shaft and the valve core can be clearly known and the flow proportion of different water outlets is obtained, so as to allow users to perform multi-stage control of the water flow rate according to requirements.

REFERENCE SIGNS

Figure 1:
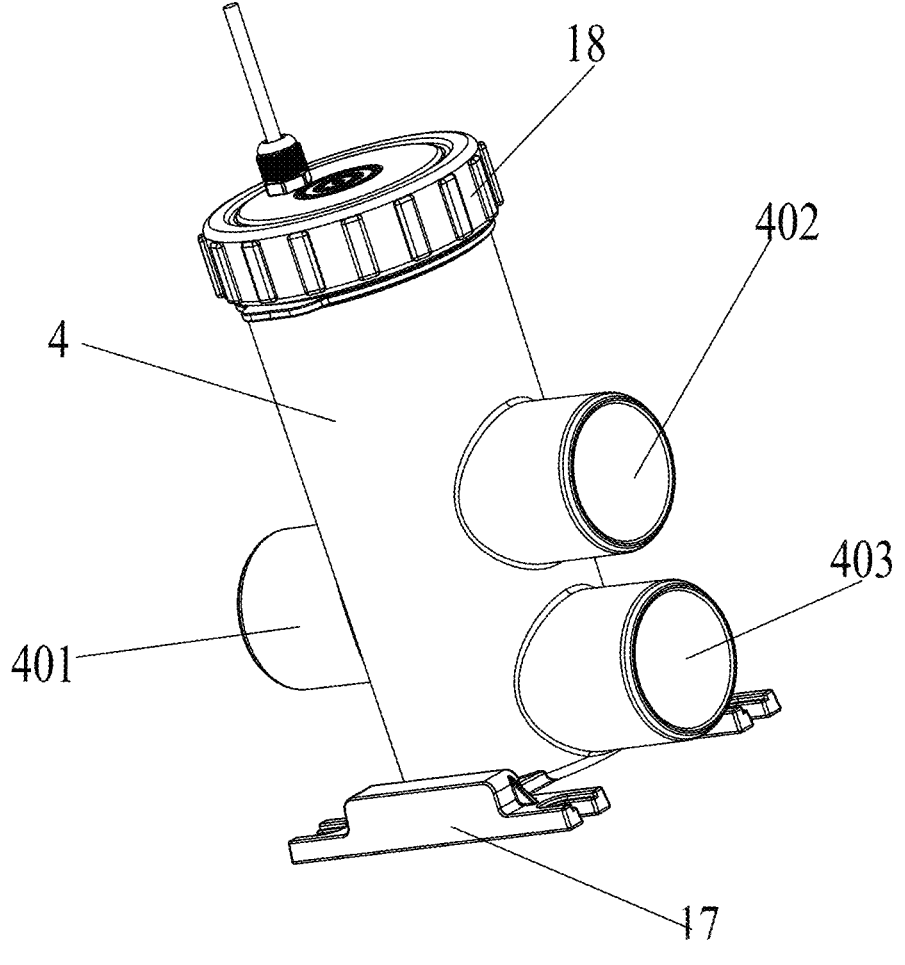
FIG. 1 is a perspective view of an electric diverter valve capable of realizing accurate flow control in a case where a controller is hidden according to the invention.

1, controller; 101, touch panel; 102, second control circuit board; 103, mounting base; 104, lock nut; 105, base; 2, brushless direct-current motor; 3, valve core; 301, connecting portion; 302, water inlet; 303, 304, water outlet; 4, valve body; 401, water inlet tube; 402, 403, water outlet tube; 5, first control circuit board; 501, infrared detection module; 502, MCU; 6, rotating shaft; 7, connecting member; 701, connecting head; 702, adapter; 7021, waterdrop-shaped shoulder; 8, rectangular-hole position disk; 801, disk body; 802, rectangular hole; 9, mounting plate; 91, screw; 10, O-shaped sealing ring; 11, box body; 111, connecting through-hole; 112, threaded groove; 12, cover; 13, port waterproof member; 14, connecting wire; 15, second O-shaped sealing ring; 16, star-shaped sealing ring; 17, mounting stand; 18, first lock nut.

DESCRIPTION OF THE EMBODIMENTS

To gain a better understanding of the technical issue to be settled by the invention and the technical solutions and beneficial effects of the invention, the invention will be described in further detail below in conjunction with accompanying drawings and embodiments. It should be understood that the specific embodiments described below are merely used for explaining the invention, and are not intended to limit the invention.

Referring to FIG. 1, FIG. 2, FIG. 3 and FIG. 7, an electric diverter valve capable of realizing accurate flow control comprises a controller 1, a brushless direct-current motor 2, a valve core 3 and a valve body 4, wherein the valve core 3 is provided with a connecting portion 301, a water inlet 302 and two water outlets 303 and 304, and the water outlets 303 and 304 are distributed along an axis with one above the other and are staggered by a phase angle. According to actual application requirements, multiple water outlets may be arranged. A water inlet tube 401 corresponding to the water inlet 302 and water outlet tubes 402/403 respectively corresponding to the water outlets 303/304 are arranged on the valve body 4 of the valve core 3, wherein the water outlet tubes 402 and 403 are distributed along the axis with one above the other.

Specifically, referring to FIG. 1, FIG. 2, FIG. 3 and FIG. 8, the electric diverter valve capable of realizing accurate flow control provided by the invention further comprises a first control circuit board 5 which is arranged fixedly, and an infrared detection module 501 and a MCU 502 which are arranged on the first control circuit board 5. The controller 1 is electrically connected to the first control circuit board 5 and the brushless direct-current motor 2 in sequence, a rotating shaft 6 of the brushless direct-current motor 2 is detachably connected to the valve core 3 through a connecting member 7. A rectangular-hole position disk 8 is fixedly arranged on the rotating shaft 6 and comprises a disk body 801 and a plurality of rectangular holes 802 which are regularly formed in the disk body 801 in a circumferential direction and have different lengths (for example different lengths in the circumferential direction of the disk body). The infrared detection module 501 is located above one side of any one rectangular hole 802 and used for transmitting infrared signals and receiving infrared signals reflected by the disk body 801 or the rectangular hole 802 of the disk body 801 when the rotating shaft 6 rotates. The MCU 502 is capable of acquiring the length of the current rectangular hole 802, located below the infrared detection module 501, based on the duration/length of time of the returned week infrared signals via the current rectangular hole 802 to obtain an absolute position of the rotating shaft 6 and feed the relative position of the rotating shaft 6 back to the controller 1. Users control, through the controller 1, the brushless direct-current motor 2 to perform phase rotation to drive the connecting member 7 and the valve core 3 to rotate forward or reversely with respect to the valve body 4, such that multi-stage control of the outlet flow rate of the valve body 4 is realized.

Figures 8, 9:
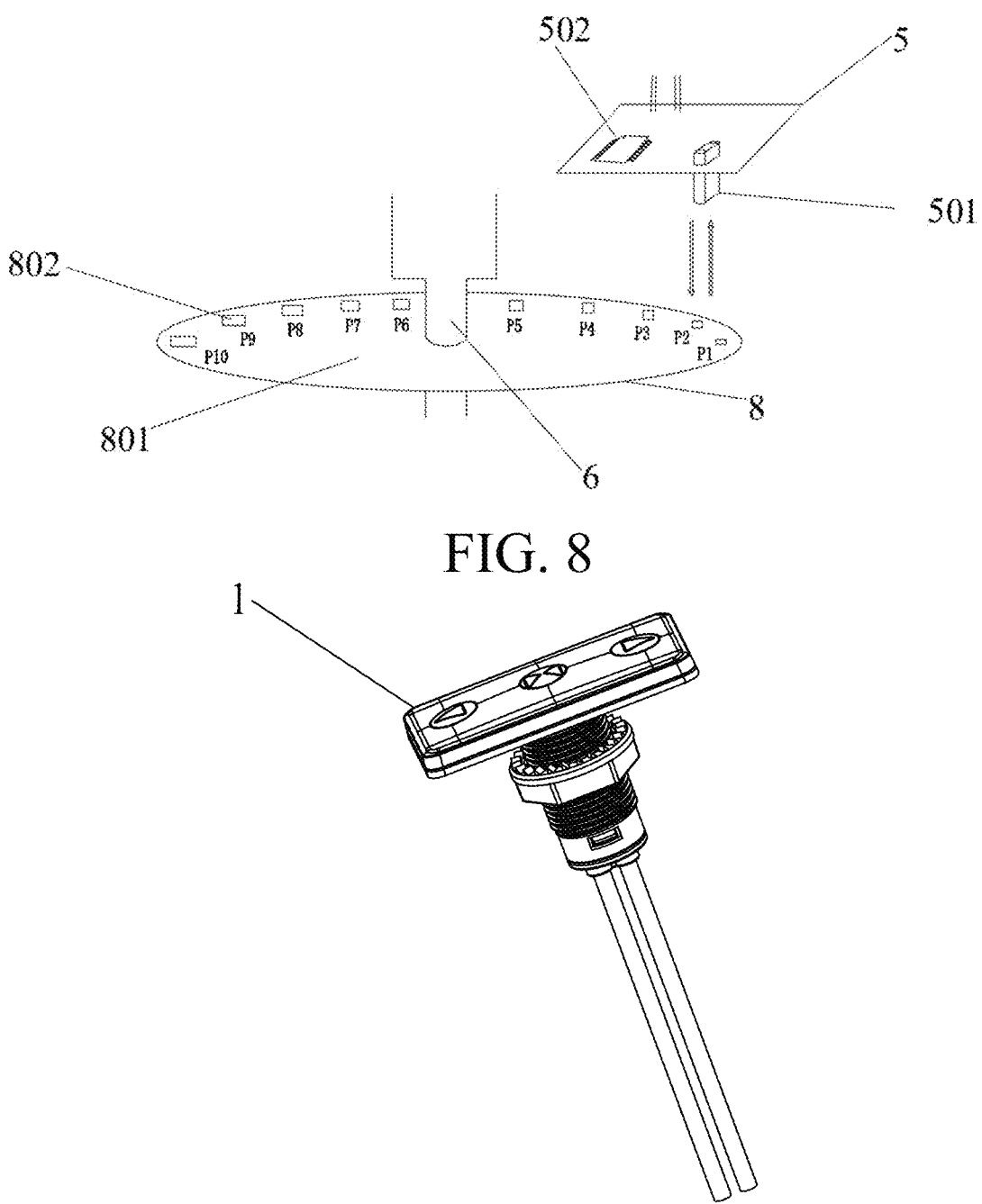
FIG. 8 illustrates a rectangular-hole position disk and a first control circuit board according to the invention.
FIG. 9 is a perspective view of a controller according to the invention.
Figure 10:
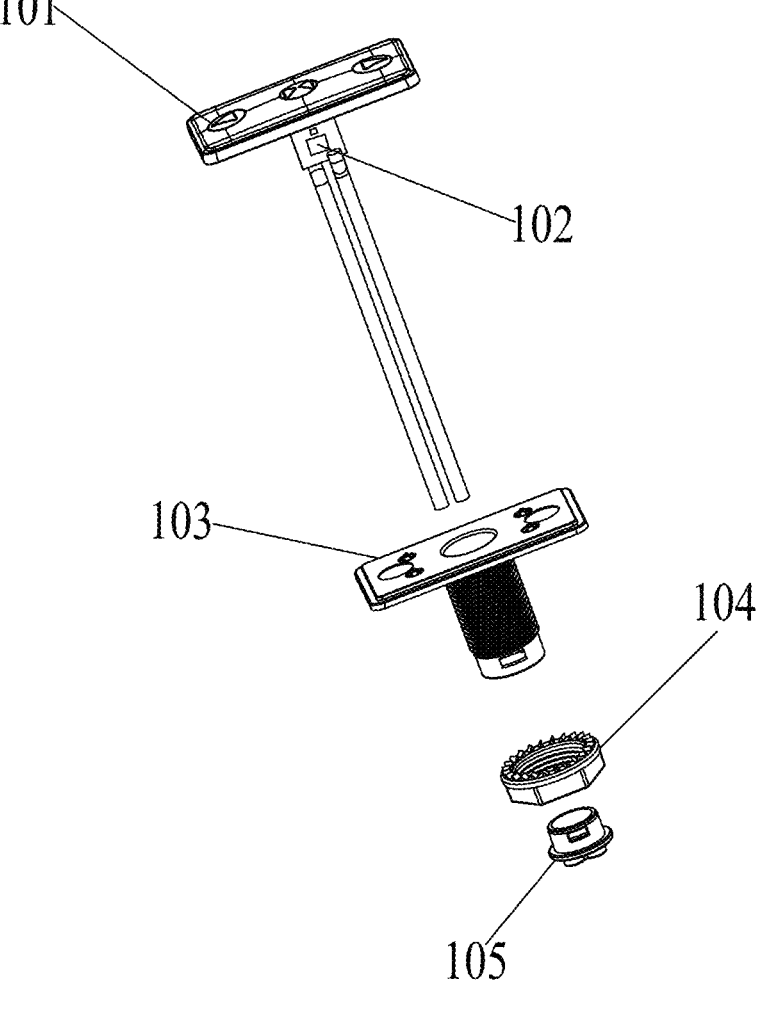
FIG. 10 is an exploded view of the controller in FIG. 9.

Wherein, referring to FIG. 9 and FIG. 10, the controller 1 is specifically a touch controller, which comprises a touch panel 101, a second control circuit board 102, a mounting base 103, a lock nut 104 and a substrate 105. A plurality of flow control knobs/buttons are arranged on the touch panel 101, the second control circuit board 102 is electrically connected to the first control circuit board 5 and the brushless direct-current motor 2 in sequence, and the touch controller is fixedly mounted on a mount through the mounting base 103 and the lock unit 104. Wherein, the rectangular holes 802 are in one-to-one correspondence with the flow control buttons.

Users can select the corresponding outlet flow rate of the water outlets 303 and 304 by touching the flow control buttons, and the rectangular holes 802 are in one-to-one correspondence with the flow control buttons. After the flow rate is selected, the second control circuit board 102 controls the brushless direct-current motor 2 to perform phase rotation to thereby drive the connecting member 7 and the valve core 3 to rotate forward or reversely with respect to the valve body 4. Each rectangular hole 802 has a specific length corresponding to a specific flow rate. When driving the rectangular-hole position disk 8 to rotate to make the rectangular hole 802 corresponding to the selected flow rate, the rotating shaft 6 stops rotating, such that the corresponding flow rate of the water outlets 303 and 304 is controlled.

As shown in FIG. 2, FIG. 3, FIG. 4, FIG. 5 and FIG. 6, the electric diverter valve provided by the invention further comprises a waterproof box for accommodating the brushless direct-current motor 2 and the first control circuit board 5, wherein the waterproof box is clamped and mounted on the valve body 4 through a first lock nut 18 and the valve body 4. The waterproof box comprises a box body 11 and a cover 12, wherein an O-shaped sealing ring 10 is arranged between the cover 12 and the box body 11.

Wherein, a connecting through-hole 111 is formed in the bottom of the box body 11, threaded holes 112 are formed in an inner surface close to the bottom of the box body 11, the brushless direct-current motor 2 and the first control circuit board 5 are fixedly mounted on a mounting plate 9, and the mounting plate 9 is fixedly mounted in the box body 11 through screws 91 engaged in the threaded holes 112, such that the brushless direct-current motor 2 and the first control circuit board 5 are fixedly mounted in the box body 11. The valve core 3 has a connecting portion 301 which passes through the connecting through-hole 111 and is then connected to the connecting piece 7 to be limited.

The connecting member 7 comprises an adapter 702 and a connecting head 701 inlaid in the adapter 702, wherein the adapter 702 is limited in and connected to a D-shaped recess in the connecting portion 301 of the valve core 3, the connecting head 701 is also D-shaped, and the connecting head 701 is connected to a flat portion of the flat-milled rotating shaft 6. In addition, a waterdrop-shaped shoulder 7021 is arranged at an end, close to the brushless direct-current motor 2, of the adapter 702.

Figure 2:
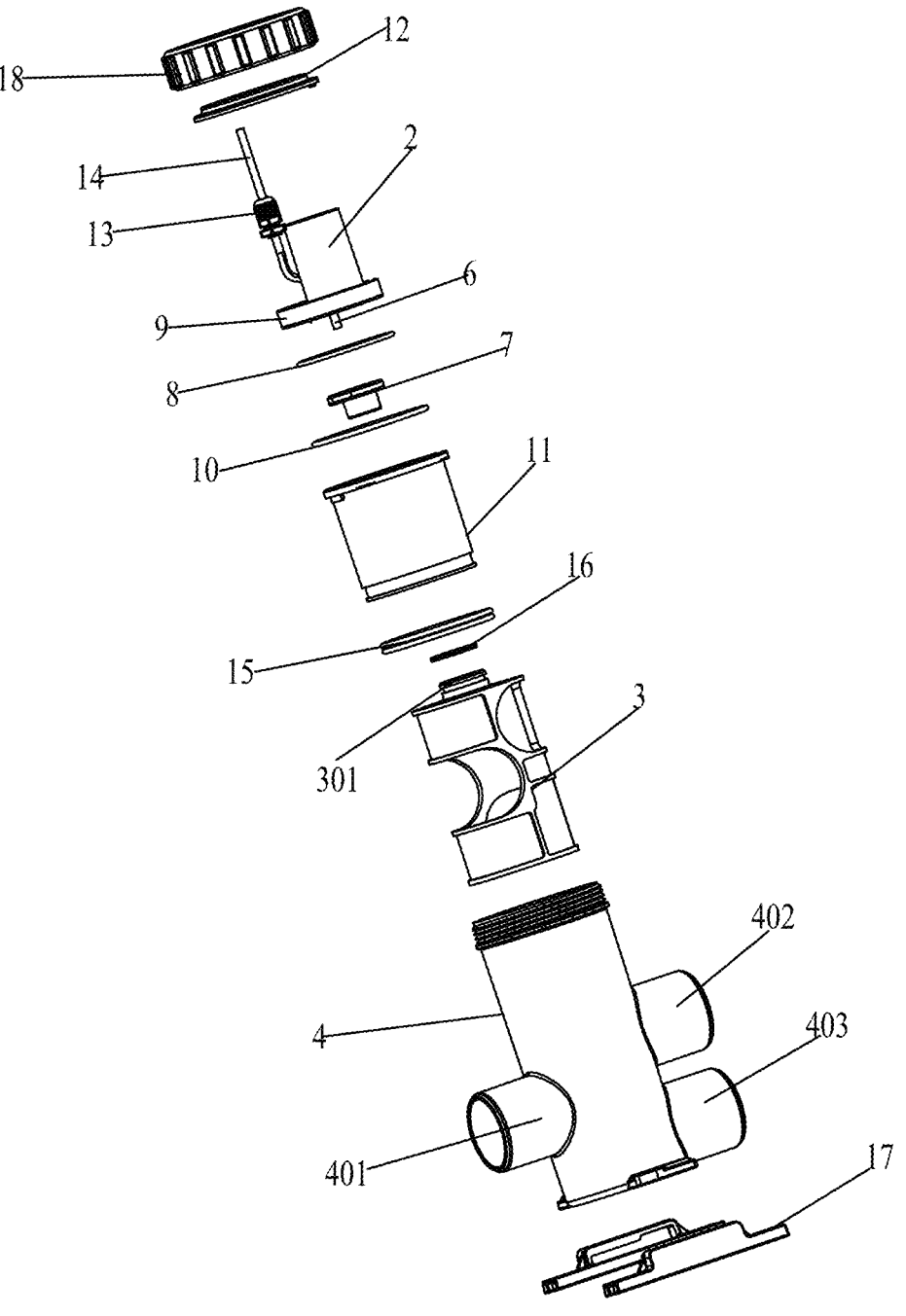
FIG. 2 is an exploded view of the electric diverter valve capable of realizing accurate flow control in the case where the controller is hidden according to the invention.
Figure 3:
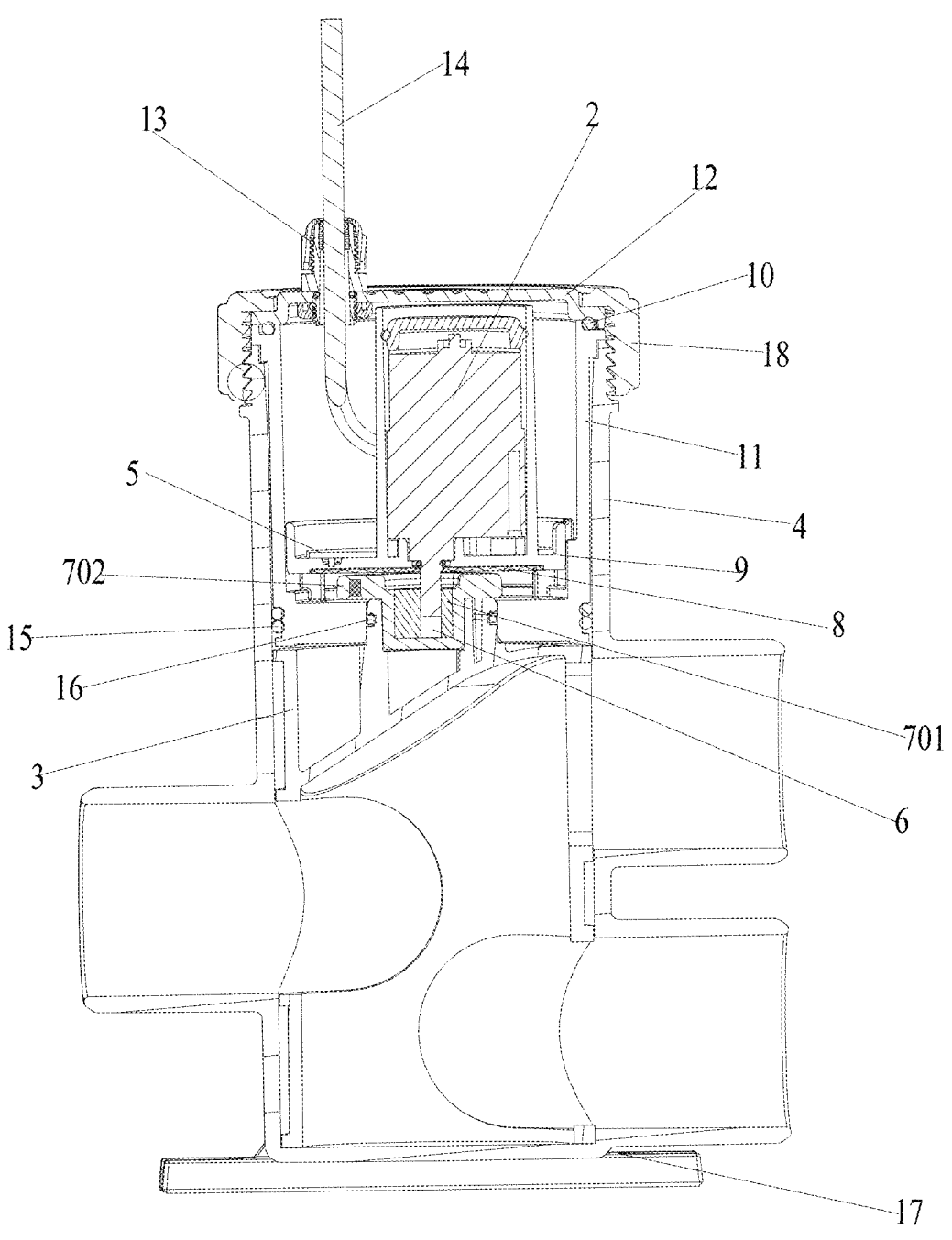
FIG. 3 is a sectional view of the electric diverter valve capable of realizing accurate flow control in the case where the controller is hidden according to the invention.
Figure 4:
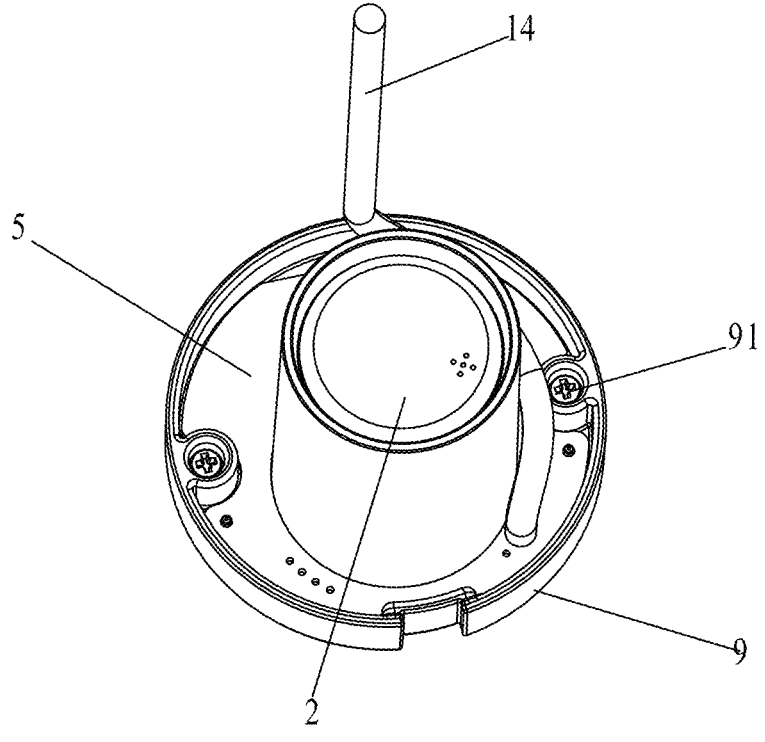
FIG. 4 is a partial three-dimensional structural view of the electric diverter valve capable of realizing accurate flow control according to the invention.
Figure 5:
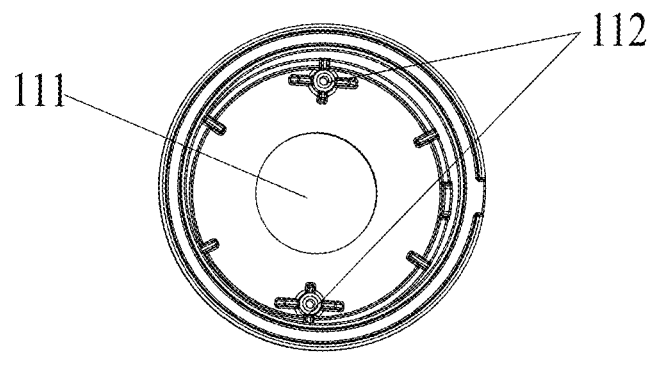
FIG. 5 is a perspective view of a waterproof box of the electric diverter valve capable of realizing accurate flow control according to the invention.
Figures 6, 7:
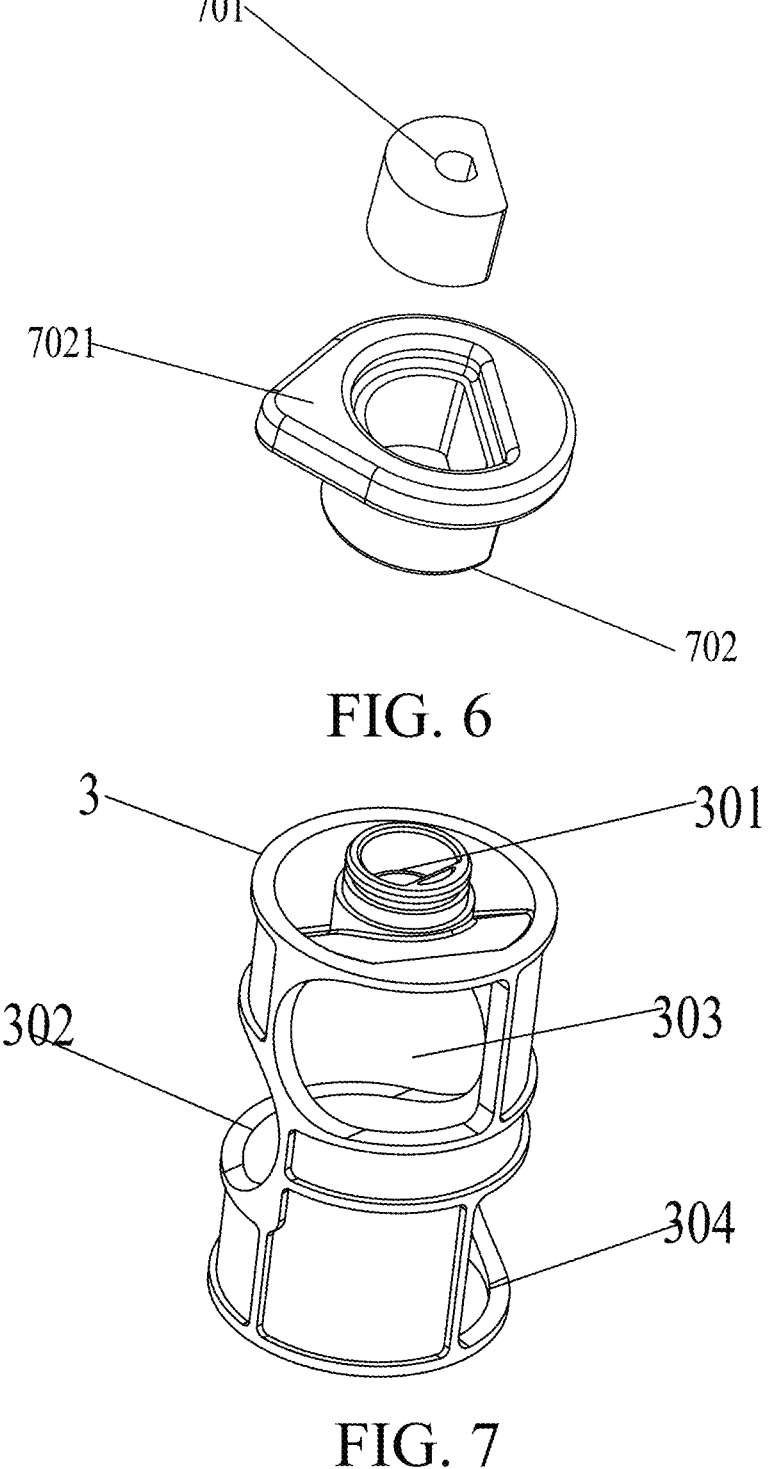
FIG. 6 is an exploded view of a connecting member of the electric diverter valve capable of realizing accurate flow control according to the invention.
FIG. 7 illustrates a valve core of the electric diverter valve capable of realizing accurate flow control according to the invention.

Referring to FIG. 2, FIG. 3 and FIG. 8, the infrared detection module 501 comprises an infrared transmitting tube and an infrared receiving tube (not labelled). When the rotating shaft 6 drives the rectangular-hole position disk 8 to rotate, the MCU 502 controls the infrared transmitting tube on the infrared detection module 501 to ceaselessly transmit a fixed-frequency infrared signal. During the rotation process of the rectangular-hole position disk 8, the infrared signals will be irradiated onto the disk body 801 and the rectangular holes 802 of the rectangular-hole position disk 8 respectively. Because the infrared signals can be irradiated further after passing the rectangular holes 802, the infrared signal received by the infrared receiving tube returned from the rectangular holes 802 will be much weaker than the returned infrared signal returned from the disk body 801. In this way, whether a position detected by the infrared detection module 501 is located at the rectangular hole 802 or the disk body 801 can be determined according to the intensity the returned infrared signals received by the infrared receiving tube. Therefore, within a period of time, the length of the rectangular hole 802 corresponding to a weak returned infrared signal can be determined according to the duration of the returned infrared signals with week intensity.

The MCU 502 receives data of the infrared signal and compares the duration of the infrared signal with a low intensity to a corresponding relationship between the duration of the infrared signal with a low intensity and the lengths of the rectangular holes 802 in the MCU 502 to obtain the length of the current rectangular hole 802 so as to obtain the relative position of the rotating shaft 6, such that multi-stage control of the corresponding water flow rate of the water outlets 303 and 304 can be completed by detecting and controlling the position of the rotating shaft 6. Because of the quick response of the infrared signal and the high processing speed of the MCU 501, accurate length data of the rectangular holes 802 can be obtained in real time to realize multi-stage control of the real-time outlet flow rate.

Referring to FIG. 2 and FIG. 3, considering the operating environment of the electric diverter valve, the electric diverter valve should be waterproof. To realize waterproof protection of the electric diverter valve, in this embodiment, a port waterproof member 13 is arranged to realize waterproof sealing of a port through which a connecting wire 14 is led into the waterproof box; in addition, an O-shaped sealing ring 10 is arranged in a mounting gap between the cover 12 and the box body 11; moreover, a second O-shaped sealing ring 15 is arranged between the waterproof box and the valve body 4; and finally, a star-shaped sealing ring 16 is arranged in a mounting gap between the connecting portion 301 of the valve core 3 and the connecting through-hole 111 of the box body 11. In this way, waterproof protection of the brushless direct-current motor 2 and the first control circuit board 5 is realized.

Referring to FIG. 2 and FIG. 3, further, a mounting stand 17 is arranged on the valve body 4.

According to the electric diverter valve capable of realizing accurate flow control, the controller 1 controls the brushless direct-current motor 2 to perform phase rotation to drive the connecting member 7 and the valve core 3 to rotate forward or reversely with respect to the valve body 4 to realize multi-stage control of the corresponding water flow rate of the water outlets, thus solving the problem that manual diverter valves are difficult to adjust and occupy a large space. Moreover, the rectangular-hole position disk is arranged to work together with the first control circuit board 5 comprising the infrared detection module 501 and the MCU 502, and the MCU 502 can obtain the length of the current/present rectangular hole according to the duration of infrared signals with week intensity reflected through the rectangular holes 802 of the rectangular-hole position disk 8 to obtain the absolute position of the rotating shaft 6 and feed the absolute position of the rotating shaft 6 back to the controller 1, such that the absolute rotation positions of the rotating shaft 6 and the valve core 3 can be clearly known to obtain the flow proportion of different water outlets, so as to allow users to perform multi-stage control of the water flow rate according to requirements.

The above embodiments are merely preferred ones of the invention. It should be noted that the above preferred embodiments should not be construed as limitations of the invention, and the protection scope of the invention should be defined by the claims. For those ordinarily skilled in the art, some improvements and modifications can be made without departing from the spirit and scope of the invention, and all these improvements and modifications should also fall within the protection scope of the invention.

What is claimed is:

1. An electric diverter valve, comprising:
   a controller;
   a brushless direct-current motor;
   a valve core comprising a water inlet and a plurality of water outlets; and
   a valve body comprising a water inlet tube and water outlet tubes in one-to-one correspondence with the water outlets;
   wherein the electric diverter valve further comprises a first control circuit board which is arranged fixedly, and an infrared detection module and a microcontroller unit (MCU) which are arranged on the first control circuit board;
   the controller is electrically connected to the first control circuit board and the brushless direct-current motor in sequence;
   a rotating shaft of the brushless direct-current motor is detachably connected to the valve core through a connecting member;
   a position disk is fixedly arranged on the rotating shaft and comprises a disk body and a plurality of rectangular holes which are regularly formed in the disk body in a circumferential direction and have different lengths;

the infrared detection module is located above a side of any one of the rectangular holes and configured for transmitting infrared signals and receiving infrared signals reflected by the disk body or the rectangular holes when the rotating shaft and the position disk rotate;

the MCU is configured to acquire a length of a present one of the rectangular holes located below the infrared detection module according to an intensity and duration of the reflected infrared signals via the present one of the rectangular holes to obtain an absolute position of the rotating shaft and feeds the absolute position of the rotating shaft back to the controller; and a user is capable of controlling, through the controller, the brushless direct-current motor to drive the connecting member and the valve core to rotate forward or reversely with respect to the valve body, such that multi-stage control of a corresponding water flow rate of the water outlets is realized.

2. The electric diverter valve according to claim 1, wherein the controller is a touch controller which comprises a touch panel and a second control circuit board; a plurality of flow control buttons is arranged on the touch panel; and the second control circuit board is electrically connected to the first control circuit board and the brushless direct-current motor in sequence.

3. The electric diverter valve according to claim 2, wherein the rectangular holes are in one-to-one correspondence with the flow control buttons.

4. The electric diverter valve according to claim 1, wherein the infrared detection module comprises an infrared transmitting tube and an infrared receiving tube.

5. The electric diverter valve according to claim 1, wherein the electric diverter valve further comprises a waterproof box for accommodating the brushless direct-current motor and the first control circuit board, the waterproof box is mounted in the valve body and comprises a box body and a cover, and an O-shaped sealing ring is arranged between the cover and the box body.

6. The electric diverter valve according to claim 5, wherein a connecting through-hole is formed in a bottom of the box body, the valve core is provided with a connecting portion, and the connecting portion passes through the connecting through-hole and is then connected to the connecting member.

7. The electric diverter valve according to claim 6, wherein a star-shaped sealing ring is arranged between the connecting portion of the valve core and the connecting through-hole of the waterproof box.

* * * * *